(12) United States Patent
Wendling

(10) Patent No.: US 8,135,825 B2
(45) Date of Patent: Mar. 13, 2012

(54) METHOD FOR LOADING AND MANAGING AN APPLICATION ON MOBILE EQUIPMENT

(75) Inventor: Bertrand Wendling, Viroflay (FR)

(73) Assignee: Nagravision SA, Cheseaux-sur-Lausanne (CH)

( * ) Notice: Subject to any disclaimer, the term of this patent is extended or adjusted under 35 U.S.C. 154(b) by 791 days.

(21) Appl. No.: 11/877,141

(22) Filed: Oct. 23, 2007

(65) Prior Publication Data

US 2008/0096608 A1 Apr. 24, 2008

(30) Foreign Application Priority Data

Oct. 23, 2006 (EP) .................................. 06291665

(51) Int. Cl.
*G06F 15/173* (2006.01)
*H04L 12/28* (2006.01)
*G01R 31/08* (2006.01)

(52) U.S. Cl. ..................... 709/224; 370/216; 370/395.21

(58) Field of Classification Search .................. 709/219, 709/223, 203, 224; 455/558, 418, 419, 414.1; 370/465, 466, 467, 328, 329

See application file for complete search history.

(56) References Cited

U.S. PATENT DOCUMENTS

| | | | |
|---|---|---|---|
| 6,718,540 B1 * | 4/2004 | Azua et al. | ...................... 717/148 |
| 6,938,166 B1 * | 8/2005 | Sarfati et al. | ................... 382/116 |
| 7,054,660 B2 * | 5/2006 | Lord | ............................. 455/558 |
| 7,844,819 B2 * | 11/2010 | Minemura | ..................... 713/176 |
| 2002/0196786 A1 | 12/2002 | Laumen et al. | |
| 2003/0041127 A1 | 2/2003 | Turnbull | |
| 2006/0089914 A1 * | 4/2006 | Shiel et al. | ....................... 705/52 |
| 2006/0223503 A1 * | 10/2006 | Muhonen et al. | ........... 455/414.1 |
| 2006/0270457 A1 * | 11/2006 | Lord | ............................. 455/558 |

FOREIGN PATENT DOCUMENTS

| | | |
|---|---|---|
| JP | 2000-250743 | 9/2000 |
| WO | 98/57474 | 12/1998 |
| WO | 99/61983 | 12/1999 |

OTHER PUBLICATIONS

European Search Report, European Patent Application No. 06 29 1665, Filing Date: Oct. 23, 2006.

* cited by examiner

*Primary Examiner* — Hanh Nguyen
(74) *Attorney, Agent, or Firm* — DLA Piper LLP US

(57) ABSTRACT

A method for loading and managing a software application in a mobile equipment intended to receive digital data of mobile television services broadcasted via a unidirectional mobile network comprising system software stored in a memory and at least one security module. The application is associated with broadcasted mobile television services of the DVB-H type. The method, comprises a previous step of transmitting, at connection of the mobile equipment to a bidirectional mobile network, identification data of the mobile equipment and of the security module to the managing center, and a further step of reading by the system software of the mobile equipment a descriptor stored in the security module designating a server of the managing center suitable for providing the mobile equipment with the application or an update of said application by downloading into said mobile equipment via the bidirectional mobile network. The invention further includes a security module for mobile equipment containing at least one descriptor designating a server of a managing center suitable for providing the mobile equipment with an application or an update of said application by downloading into said mobile equipment.

12 Claims, 2 Drawing Sheets

METHOD FOR LOADING AND MANAGING AN APPLICATION ON MOBILE EQUIPMENT

FIELD OF THE INVENTION

The present invention relates to the field of mobile equipments comprising one or more software applications intended to protect and secure broadcasted digital services such as, for example, interactive Pay-TV, audio contents, games, software or continuous information services such as weather forecasts, stock exchange news, sports results or the like.

BACKGROUND OF THE INVENTION

The concept of mobile equipment is used in a wide signification and refers to an apparatus such as for example, a mobile telephone, a PDA (Personal Digital Assistant), a portable digital television receiver, a laptop computer, etc.

Mobile equipment generally includes at least one removable security module being used on one hand for identifying the equipment at connection to a network and on the other hand for controlling access to services broadcasted by the network. This security module it known as a SIM card (Subscriber Identity Module) or USIM (Universal Subscriber Identity Module) for 3rd generation equipment suitable for connecting to a UMTS (Universal Mobile Telecommunications System) network or even a RUIM (Re-Usable Identification. Module) for equipment designed to access a COMA (Code Division Multiple Access) network.

During manufacturing and/or during a personalization phase of the security module, the operator managing the network and the broadcasted services introduces an identifier of the IMSI (International Mobile Subscriber Identification) type for identifying, in a secure and unique way, each subscriber wishing to connect to a mobile network.

Moreover, each mobile equipment is physically identified by a number stored in a non-volatile memory of the equipment. This number, called IMEI (International Mobile Equipment Identifier), contains an identification of the type of the mobile equipment and a serial number for identifying in a unique way a given mobile equipment on a network of the GSM (Global System for Mobile Communications), GPRS (General Packet Radio System) UMTS, (Universal Mobile Telecommunications System), 3GPP (3rd Generation Partnership Project) type or the like. Mobile equipment is also characterized by a software version SVN (Software Version Number) indicating the update status of the System software installed on the mobile equipment. The combination of the identification of the type and the serial number of the mobile equipment with the software version (SVN) gives a new identification, called IMEISV (International Mobile Equipment Identifier and Software Version Number). In the case of IP (Internet Protocol) mobile networks of the WLAN (Wireless Local-Area Network), WiFi (Wireless Fidelity) type or the like, the physical identifier can be a MAC (Media Access Control) address that corresponds to the unique address that identifies the hardware configuration of a user on the network and the software version can be transmitted by higher layer protocols based on IP.

During the activation of a mobile equipment, more particularly at its connection to the network of an operator, information comprising the identification data is exchanged between the mobile equipment and the managing centre of the operator that may or may not authorize its use. As the services offered to users become increasingly developed, their security must be increased accordingly in order to protect the users and the operators against fraud committed by third parties attempting to obtain access or services illegally.

The document WO98/57474 describes a wireless telephone handset provided with a smart card in which an address of an Internet provider is stored. The card is read by the handset equipped with a browsing software using the stored address to connect the handset to the Internet. The card also includes one or more micro-servers that each have an address allowing data exchanges with the Internet and a memory for storing different user data. The functions or applications memorized by the card's micro-servers, such as for example an access program to a bank account or an electronic purse, can be downloaded and updated on the Internet.

The document US2003/0041127 describes a system and a method for updating the firmware of an apparatus, via a communication network. The method includes the steps of determining the current version of a firmware installed in the apparatus, searching of predetermined updating sites, comparing the current version of the firmware with the available version and sending e-mails to notify when firmware updating is necessary.

Mobile television services, within the scope of standard ETSI TS 102 474. "IP Datacast over DVB-H: Service Purchase and Protection (SPP)" involve the use of an owner security application in the mobile equipment. According to the standard, this application can be defined in the form of a Java application loaded into the equipment to be executed on a Java Virtual Machine. The application communicates with the elements of the mobile equipment (IP stack, SIM card, display, keyboard, etc. . . . ) via API (Application Programming Interface) interfaces standardized by the Java environment.

Presently, the application allowing the protection and security of the data broadcasted by mobile television services is installed in the mobile equipment during Manufacturing and it is dedicated to a specific market. The standard ETSI TS 102 474 does not provide any means for loading this application into the equipment, for example, when it is first activated or connected to the network.

It should be noted that the applications installed in a mobile equipment do not necessarily function in a structure based on the Java environment. They can also be loaded, for example, in the form of binary code by using the resources provided by an operating system such as MS-Windows-CE, Linux etc.

SUMMARY OF THE INVENTION

The aim of the present invention is to provide the possibility of loading a security application for broadcasted television services in a mobile equipment having a generic configuration while still respecting the standardized specifications.

This aim is achieved by a method for loading and managing a software application, in a mobile equipment intended to receive digital data of mobile television services broadcasted via a unidirectional mobile network comprising system software stored in a memory and at least a security module, said software application being associated to broadcasted mobile television services, the method, comprises a previous step of transmitting, at connection of the mobile equipment to a bidirectional mobile network different from the unidirectional mobile network, identification data of the mobile equipment and of the security module to the managing centre, and a further step of reading by the system software of the mobile equipment a descriptor stored in the security module designating server of the managing centre suitable for providing the mobile equipment with the application or an update of said application by downloading into said mobile equipment via the bidirectional mobile network:

The invention further concerns a security module for mobile equipment intended to receive digital data of mobile television services broadcasted via a unidirectional mobile network comprising a memory in which is stored at least one descriptor designating a server of a managing centre suitable for providing the mobile equipment with an application or an update of said application by downloading into said mobile equipment.

According to a preferred embodiment, the security module of the mobile equipment contains an IP address of a server suitable for providing at least one security application for protecting the data of the broadcasted mobile television services. At connection to a managing centre of an operator via a mobile network, the mobile equipment transmits device identification data and security module identification data. The managing centre then authorizes the connection of the mobile equipment to a server whose address is contained in the security module in order to download the security application adapted to the configuration of the mobile equipment and to services offered by the operator.

The server indicated by the IP address can also provide complete applications including security means, such as for example a mobile Pay-TV application that a user can download into the mobile equipment. Commercial applications specific to the operator can be added to this mobile television application including suitable controls allowing the user buying programs according to PPV (Pay-Per-View) mode and/or according to the new PPT (Pay-Per-Time) mode or even to subscribe to one or several services made available by the operator.

This IP address is stored in the security module during an initialization phase of the generic mobile equipment carried out for example when the mobile equipment connects to the network for first time. It can also be stored during manufacturing of the security module or rather at personalization steps during which identifiers such as IMSI are registered.

BRIEF DESCRIPTION OF THE DRAWINGS

The invention will be better understood thanks to the following detailed description that refers to the enclosed drawings that are, given as a non-limitative example, namely.

DETAILED DESCRIPTION OF THE INVENTION

Figure 1:
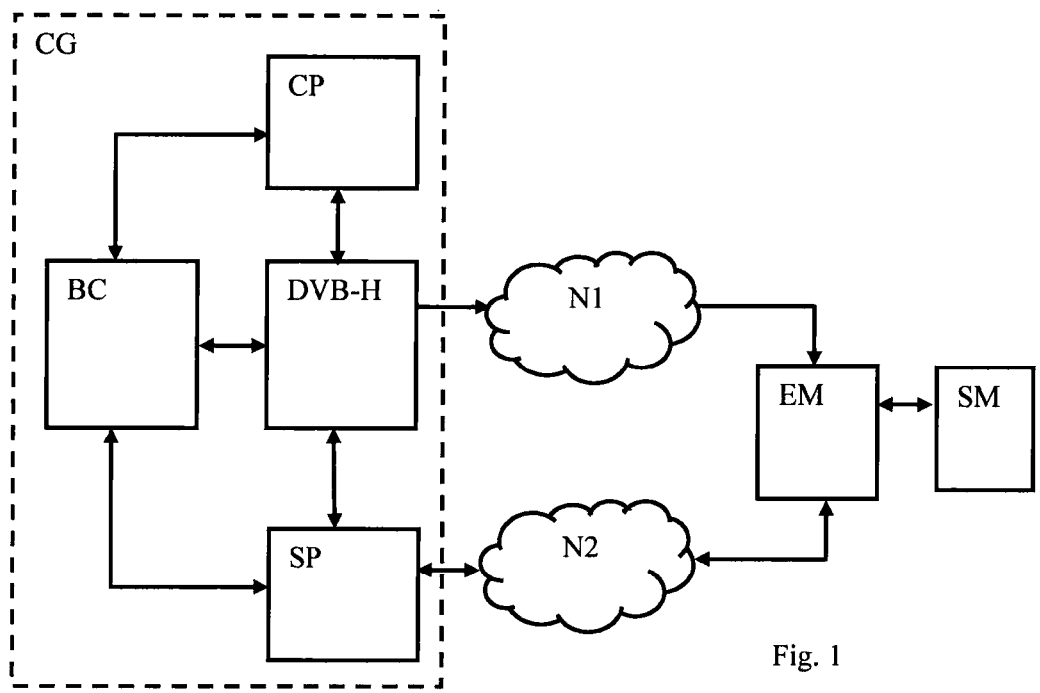
FIG. 1 shows a general block diagram of the system architecture comprising a managing centre and at least one mobile equipment connected to a mobile broadcasting network of the DVB-H type and to a bidirectional mobile network, of the UMTS type.

The invention, is applied more particularly to a system called IP Datacast used by DVB (Digital Video Broadcasting) for creating DVB-H (Digital Video Broadcasting-Handheld-Portable) services. The latter are integrated into a hybrid network made up of a bidirectional mobile network of the GPRS, UMTS (N2) type or the like and Of a unidirectional broadcasting network of DVB-H services (N1) different from the bidirectional network (N2) as shown in FIG. 1.

The managing centre (CG) includes a content control unit (CP) responsible for coding, storing and preparing the content to be broadcasted via the unidirectional, network (N1), a processing unit (DVB-H) in charge to create a stream for transporting the content combined with data provided by the content and services (SP) protection unit the latter encrypts the content, manages content access rights and communicates with the mobile equipment (EM) via the bidirectional network (N2). These interconnected units are controlled by a broadcasting control unit (BC) that controls which content with which access criteria is transmitted at a given time. The mobile equipment (EM) provided with a security module (SM) connected to both networks (N1, N2) decrypts the content broadcasted in the stream prepared by the processing unit (DVB-H) according to the rights, registered in the security module (SM).

According to one example, at activation, the mobile equipment identifies the services available thanks to a service guide (ESG) Electronic Services Guide. The user orders one of the available services via a secured transaction with the service provider who determines if the service will be broadcasted in unidirectional way via a part of the DVB-H stream or if the service will be provided by the interactive bidirectional mobile network. This choice is made on the basis of service audience measuring results and allows an optimal distribution of the DVB-H stream capacity according to the number of active users in a given area. The access to the broadcasted content is controlled on the basis of the rights acquired by users.

Figure 2:
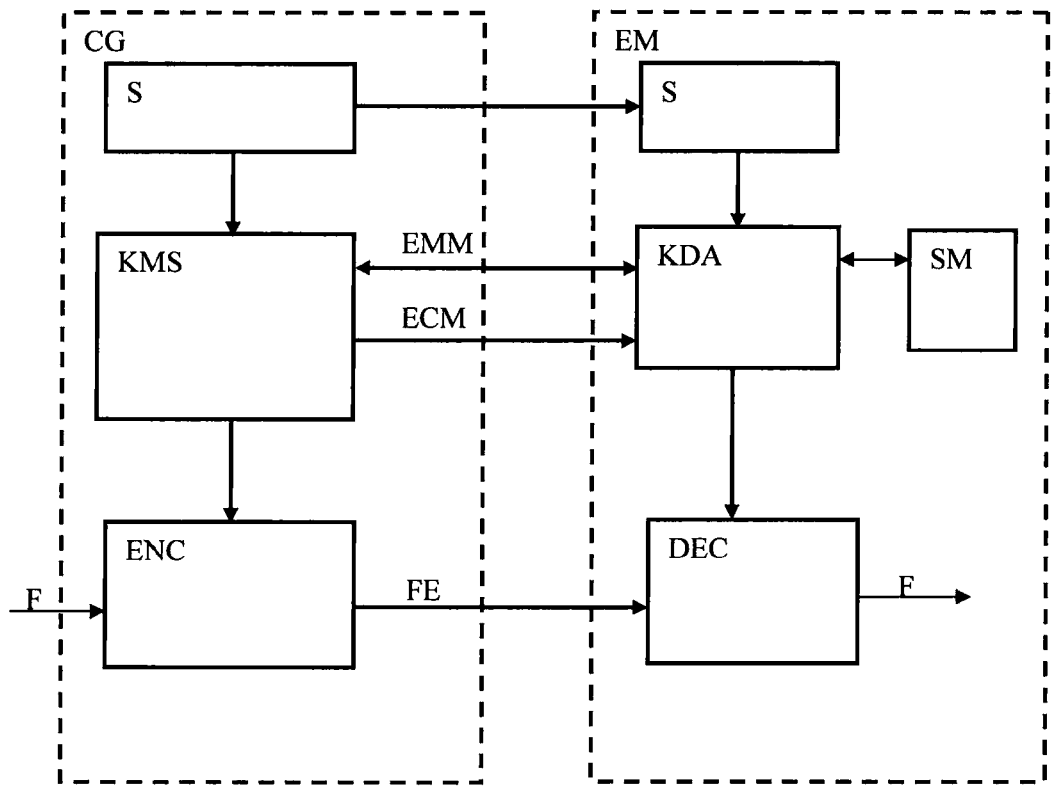
FIG. 2 shows a block diagram of the applications and of the units activated to secure communications between the managing centre and mobile equipment provided with a security module.

According to a preferred embodiment the security system of a mobile equipment intended to receive Pay-TV services is based on a structure called Open Security Framework that allows compatibility with different key managing system solutions (KMS) Key Managing System. These systems located at the managing centre (CG) are in charge as well as for administration of the users rights by means of managing messages EMM (Entitlement Managing Message) as for administration of encryption keys of broadcasted contents by means of control messages ECM (Entitlement Control Message). FIG. 2 shows a block diagram of the applications used for protection of the data exchanged between the managing centre (CG) and the mobile equipment (EM).

The managing centre (CG) includes a key managing system (KMS) controlled by session information (S) related to the selected service transmitting the EMM and ECM messages towards the mobile equipment. This system is also in charge for encrypting the stream with the encryption unit (ENC) before its broadcasting with keys included in the transmitted ECM, messages.

At the level of mobile equipment (EM), a security interface called KDA (Key Managing System Device Agent) can be installed in a Java environment and considered as a Java application able to access security resources of the Mobile equipment (EM).

The security application KDA contains parameters specific to an operator or to a security supplier necessary for the control of the decryption of the data and adapted to a particular key managing system (KMS). It ensures the following security functions:

reception, of EMM message transmitted by the KMS system via the unidirectional broadcasting network or Via the bidirectional mobile network.

Secure generation of access authorizations from received EMM messages.

reception of ECM message stream corresponding to a service selected on the broadcasting network.

secure generation of the keys for decrypting the broadcasted content from ECM messages of the stream.

application of the keys to the decryption unit (DEC) of the mobile equipment (EM) and control of the decryption of the content of the received service.

The KDA application communicates with the security module of the mobile equipment during each security operation such as the managing of the access rights, derived from EMM messages or the extraction of the decryption keys from the ECM messages.

An advantage of the present invention is the possibility of providing mobile equipment that has a generic configuration comprising system software and a suitable security module.

During an initialization phase, the generic mobile equipment is connected to the bidirectional mobile network (N2) according to a known process comprising the identification of the mobile equipment and of the security module carried out by the managing centre (CG). The latter, after acceptance of the mobile equipment, transmits information relating to the mobile television operators DVB-H or other service providers and to their benefits in order to allow the user to make a choice according to his/her wishes. The selection of a given supplier leads to the transition of an IP address by the managing centre (CG), via the bidirectional mobile networks (N2), towards the security module wherein this address will be stored. In this way the mobile equipment can be "personalized" by the downloading and the installation of specific applications by means of a server designated by the stored IP address. The updates and additional benefits of the chosen provider are, preferably, also loaded into the mobile equipment via this server of the bidirectional mobile network (N2).

The security application (KDA) or any other application to be downloaded into the mobile equipment (EM) via the IP address of the security module can be specific either to one or a combination of the type of security module, the version of the security module, the model of the mobile equipment, and the version of the mobile equipment. The latter are transmitted to the managing centre via IMSI and IMEISV, either at connection of the mobile equipment to the bidirectional mobile network (N2), or in a downloading request or after identification by the managing centre (CG), via the bidirectional network (N2), of the configuration of the mobile equipment or the configuration of the security module or both the configuration of the mobile equipment and the configuration of the security module when updating the application. Such identification can be carried out regularly when a rigorous maintenance of the application is required by the service providers.

Figure 3:
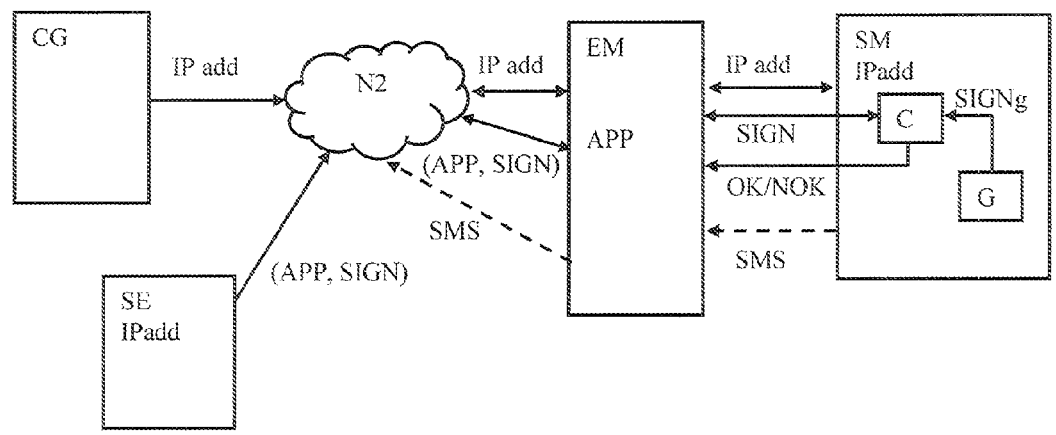
FIG. 3 shows a block diagram representing the management of an application provided by a server to the mobile equipment and verified by the security module using a signature.

According to another configuration, the application (APP) installed in the mobile equipment (EM) can verify automatically at predetermined periods the availability of updates, via the server (SE) designated by the IP address (IPadd) stored in the security module (SM), in order to download them if necessary, see (FIG. 3).

According to an embodiment, the IP address can depend on one or a combination of the manufacturer, the model, and the version of the security module, etc.

An update can either be optional or mandatory and in this case the security module can block or restrict certain access functionalities to broadcasted service data until the execution of the update.

The update can be initialized by a message encrypted with a key known by the security module (SM) transmitted by the managing centre (CG) In this way the security module (SM) can compare and verify the version of the application (APP) installed in the mobile equipment with the one available on the server (SE) of the Managing centre (CG) with the information contained in the message. When the available version is higher than the installed version, the security module (SM) transmits a downloading command to the application (APP) via the IP address (IPadd).

When the loaded Version cannot be authenticated by means of a signature (SIGNg) generated (G) by the security module (SM) and the one (SIGN) provided by the server (SE), i.e. the comparison (C) of the signatures (SIGNg≠SIGN) results in a difference (NOK), the module can also restrict or block functions of the mobile equipment.

This security measure allows the managing centre or the operator detecting attempts to hack the application.

According to an embodiment, instead of blocking the mobile equipment (EM), the security module (SM) can generate a short message of the SMS type (Short Message Service) for the operator notifying a fraud attempt from the user. When these messages (SMS) become numerous for a given security module identifier, the operator can either suspend all the access rights or the subscription to broadcasted services, or send warning messages indicating that the operator has identified the user having hacked its mobile equipment.

The invention claimed is:

1. A method for loading and managing an application in a mobile equipment locally connected to at least one security module, the mobile equipment being configured for receiving digital data of mobile television services broadcast via a unidirectional mobile network, the method comprising:

transmitting, by the mobile equipment, via a bidirectional mobile network different from the unidirectional mobile network, data identifying the mobile equipment and the security module to a managing center upon connection of the mobile equipment to the bidirectional mobile network;

receiving, by the mobile equipment, information relative to one or more service providers from the managing center;

receiving by the mobile unit and storing into the security module a descriptor designating a server of applications at the managing center corresponding to a selected service provider;

reading, by the mobile equipment, the descriptor stored in the security module;

downloading the application or an update of the application from the server at the managing center designated by the descriptor, via the bidirectional mobile network, into a memory of the mobile equipment; and verifying by the security module the downloaded application or the update by comparing a signature of said application or update generated by said security module with a signature provided by the server at the managing center.

2. The method of claim 1, wherein the descriptor stored in the security module corresponds to an IP address of a server of the managing center suitable for providing at least one security application for protecting the data of mobile television services broadcast via the unidirectional mobile network.

3. The method of claim 2, wherein the IP address stored in the security module depends on one or a combination of the manufacturer, the model, the version of said security module.

4. The method of claim 2, wherein the application to be downloaded into the mobile equipment, via the server designated by the IP address of the security module, is specific either to one or a combination of the type, the version of the security module, the model, and the version of the mobile equipment.

5. The method of claim 2, wherein the application installed in the mobile equipment verifies automatically, at predetermined periods, the availability of the updates, using the IP address stored in the security module, in order to download said updates if necessary.

6. The method of claim 1, wherein the application is updated after identification by the managing center via the bidirectional network of the configuration of the mobile equipment or the configuration of the security module or both the configuration of the mobile equipment and the configuration of the security module.

7. The method of claim 1, wherein the managing-center transmits a message to the mobile equipment containing version information for available updates, the security module compares the version information of the message with version information for the application installed in the mobile equipment in order to initiate downloading, via the server designated by the IP address, if a version information of an available update is higher than the version information for the installed software application.

8. The method of claim 1, wherein the security module activates sending by the mobile equipment of a short message to the managing center when a difference is detected between the generated signature and the signature received from the server at the managing center.

9. The method of claim 1, further comprising steps of restricting or blocking by the security module functionalities of the mobile equipment in case a difference is detected between the generated signature and the signature received from the server at the managing center.

10. A security module configured for loading and managing an application in a mobile equipment locally connected to said security module, the mobile equipment being configured for receiving digital data of mobile television services broadcast via a unidirectional mobile network, the security module comprising:

a memory for storing at least one descriptor designating a server of applications at a managing center suitable for providing the mobile equipment with an application or an update of the application by downloading into said mobile equipment;

a generator for generating a signature of the downloaded application or the update of the application; and a comparator for comparing said signature with a signature provided by the server at the managing center:

wherein the security module is configured to restrict or block functionalities of the mobile equipment if a difference is detected between the generated signature and the signature received from the server at the managing center.

11. The security module of claim 10, wherein the stored descriptor represents an IP address of a server suitable for providing at least one security application for protecting the digital data of mobile television services broadcast via the unidirectional mobile network.

12. The security module of claim 10, further comprising a short messages generator activated when the signatures comparison shows a difference between the generated signature and the signature received from the server at the managing center, said short messages being sent by the mobile equipment to the managing center via the bidirectional mobile network.

* * * * *